United States Patent
Baba

(10) Patent No.: US 9,491,322 B2
(45) Date of Patent: Nov. 8, 2016

(54) IMAGE FORMING APPARATUS, METHOD FOR CONTROLLING IMAGE FORMING APPARATUS, AND SYSTEM

(71) Applicant: CANON KABUSHIKI KAISHA, Tokyo (JP)

(72) Inventor: Shohei Baba, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/729,650

(22) Filed: Jun. 3, 2015

(65) Prior Publication Data
US 2015/0358493 A1 Dec. 10, 2015

(30) Foreign Application Priority Data
Jun. 6, 2014 (JP) .................... 2014-118110

(51) Int. Cl.
*G06K 15/00* (2006.01)
*H04N 1/00* (2006.01)

(52) U.S. Cl.
CPC ...... *H04N 1/00896* (2013.01); *H04N 1/00037* (2013.01)

(58) Field of Classification Search
None
See application file for complete search history.

(56) References Cited

U.S. PATENT DOCUMENTS

| | | | | |
|---|---|---|---|---|
| 8,029,200 B2* | 10/2011 | Miyashita | ............... | B41J 29/38 347/185 |
| 2011/0019218 A1* | 1/2011 | Kuwahara | ........... | H04L 41/0213 358/1.13 |
| 2012/0075651 A1* | 3/2012 | Sasase | ................ | G06F 1/3209 358/1.13 |
| 2013/0010335 A1* | 1/2013 | Baba | ................ | G03G 15/5004 358/3.01 |
| 2013/0080806 A1* | 3/2013 | Koyama | ............... | G06F 1/3284 713/320 |
| 2013/0088743 A1* | 4/2013 | Higashi | ............... | G06K 15/005 358/1.14 |

FOREIGN PATENT DOCUMENTS

JP 2012-229077 A 11/2012

* cited by examiner

*Primary Examiner* — Marivelisse Santiago Cordero
*Assistant Examiner* — Neil R McLean
(74) *Attorney, Agent, or Firm* — Canon USA, Inc. IP Division

(57) ABSTRACT

In an image forming apparatus, when an instruction to supply power in a power-off state of the image forming apparatus is detected, control is performed such that the image forming apparatus is started by shifting from the power-off state to a standby state or is started by shifting from the power-off state to a sleep state based on transition setting information of a power supply state.

12 Claims, 15 Drawing Sheets

FIG. 3

TRANSITION SETTING SCREEN

SET TRANSITION SETTING OF POWER SUPPLY STATE

STANDBY START          SLEEP START

OK

IMAGE FORMING APPARATUS, METHOD FOR CONTROLLING IMAGE FORMING APPARATUS, AND SYSTEM

BACKGROUND

1. Field

Aspects of the present invention generally relate to a mechanism for controlling start-up in an image forming apparatus.

2. Description of the Related Art

In recent years, demands for power saving in an image forming apparatus such as a printer or a copying machine have been heightening, and a requirement related to energy saving has become important. A normal conventional image forming apparatus is known to shift to a state where printing can be immediately performed (a standby state) when powered up, and to shift to a sleep state by restricting components to be energized when it has not been used for a predetermined period of time (see Japanese Patent Application Laid-Open No. 2012-229077).

However, it is not frequent that an image forming apparatus is immediately used when powered up compared with the case of apparatuses such as a camera, a television set, and a personal computer. For example, although the image forming apparatus is powered up to coincide with an opening time, a document may often be actually printed only thirty minutes after the opening time due to a morning meeting or mail checking. In such a case, the image forming apparatus shifts to a standby state after power-up, then shifts to the sleep state, and shifts to the standby state again when printing is performed, resulting in increased power consumption. Therefore, the technique is not desirable from the viewpoint of power saving.

SUMMARY

Aspects of the present invention are generally directed to providing a technique for suppressing useless power consumption when an image forming apparatus is powered up.

According to an aspect of the present invention, an image forming apparatus includes a detection unit configured to detect an instruction to supply power in a power-off state of the image forming apparatus, and a control unit configured to perform control such that the image forming apparatus is started by shifting from the power-off state to a standby state or is started by shifting from the power-off state to a sleep state based on transition setting information of a power supply state when the detection unit detects the instruction to supply power to the image forming apparatus.

Further features of the present disclosure will become apparent from the following description of exemplary embodiments with reference to the attached drawings.

BRIEF DESCRIPTION OF THE DRAWINGS

FIG. 3 illustrates a transition setting screen.

DESCRIPTION OF THE EMBODIMENTS

An exemplary embodiment will be described below with reference to the drawings.

Figure 1:
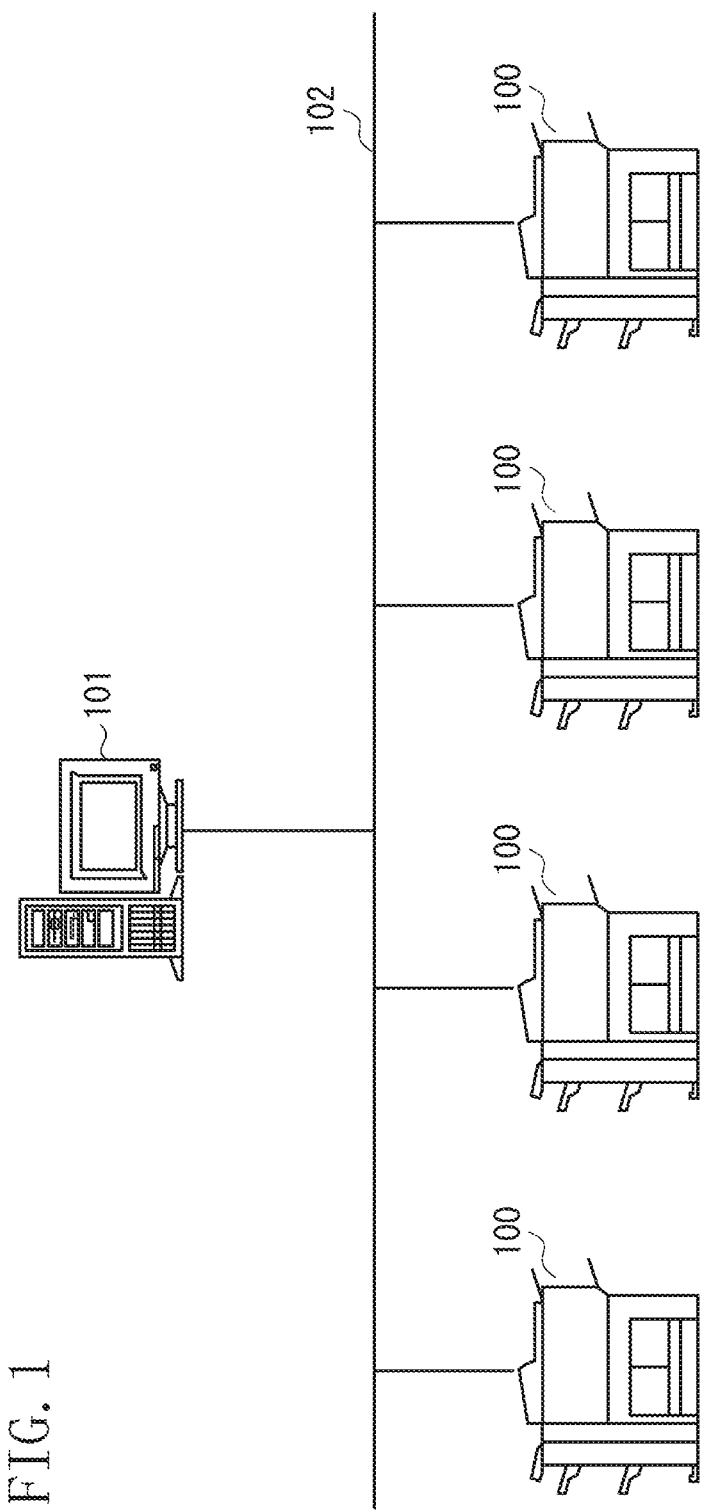
FIG. 1 illustrates an entire system according to an exemplary embodiment.

A first exemplary embodiment will be described below. FIG. 1 illustrates an entire system according to an exemplary embodiment.

An image forming apparatus 100 such as a printer or a copying machine generally receives print data from a host computer via a network 102, to perform printing. A management apparatus (information processing apparatus) 101 manages an operating status of the image forming apparatus 100. A plurality of image forming apparatuses 100 and the management apparatus 101 are connected to each other via the network 102.

Figure 2A:
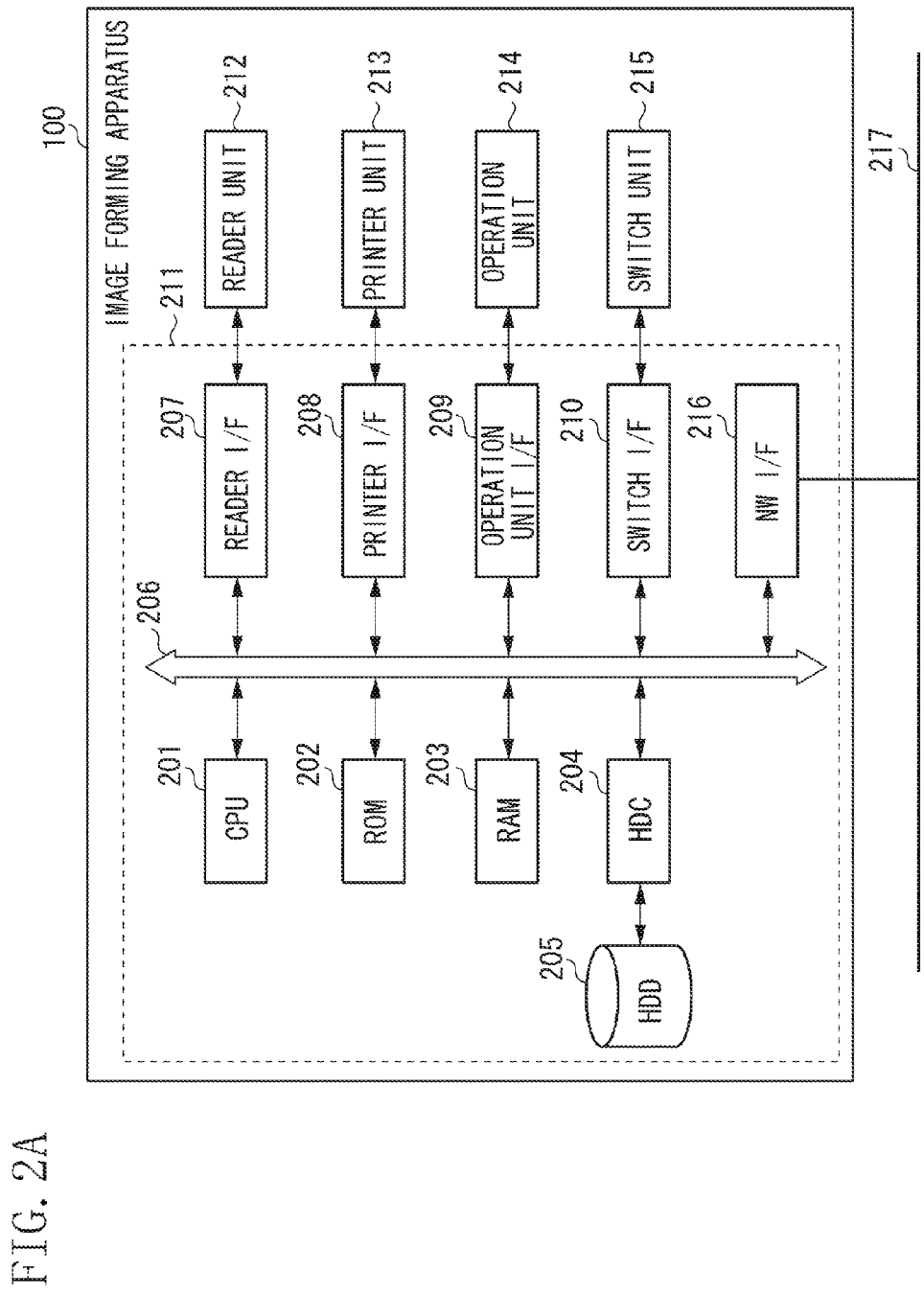
FIGS. 2A and 2B are block diagrams of an image forming apparatus.

FIG. 2A is a block diagram illustrating an example of an internal configuration of the image forming apparatus 100.

A central processing unit (CPU) 201 executes software for controlling the entire image forming apparatus 100, which is stored in a read-only memory (ROM) 202 or a hard disk (HDD) 205, and integrally controls devices connected to a system bus 206. A random access memory (RAM) 203 functions as a work area for the CPU 201. A hard disk controller (HDC) 204 controls the HDD 205. A reader interface (I/F) 207 and a printer I/F 208 are respectively connected to a reader unit 212 and a printer unit 213, to control the devices. An operation unit I/F 209 is connected to an operation unit 214, and controls display on the operation unit 214 and user input from the operation unit 214. The operation unit 214 includes a button for an operation and a display unit. A switch I/F 210 is connected to a switch unit 215, to control an operation from the switch unit 215. The switch unit 215 includes a switch for the operation. A network interface card (NIC) 216 exchanges data with an external apparatus such as the host computer via a network 217. An entire control unit 211, which is enclosed by a broken line in FIG. 2A, controls various types of devices and interfaces connected to the image forming apparatus 100 while controlling an operation of the entire image forming apparatus 100. The reader unit 212 reads an image of a document, and outputs image data corresponding to the document image to the printer unit 213 or stores the image data in the storage unit 205 in the image forming apparatus 100 in response to an instruction from a user. Further, the reader unit 211 can also transmit the image data to the host computer connected to the network 217 via the network I/F 216. The printer unit 213 prints the document read by the reader unit 212 and the image data stored in the storage unit 205 in a main body of the image forming apparatus 100. Further, the printer unit 213 can also receive a print job from the host computer connected to the network 217 via the network I/F unit 216 and print the print job. The network I/F unit 216 is connected via the network 217, and the entire control unit 211 is used to mutually communicate with another information-processing equipment on the network 217. The operation unit 214 displays information sent to the user from the entire control unit 211 or notifies the entire control unit 211 of input from the user by using a button and a display device or a liquid crystal display screen with a touch panel input, or their combination. The switch unit 215 controls a power supply state of the entire control unit 211.

Figure 2B:
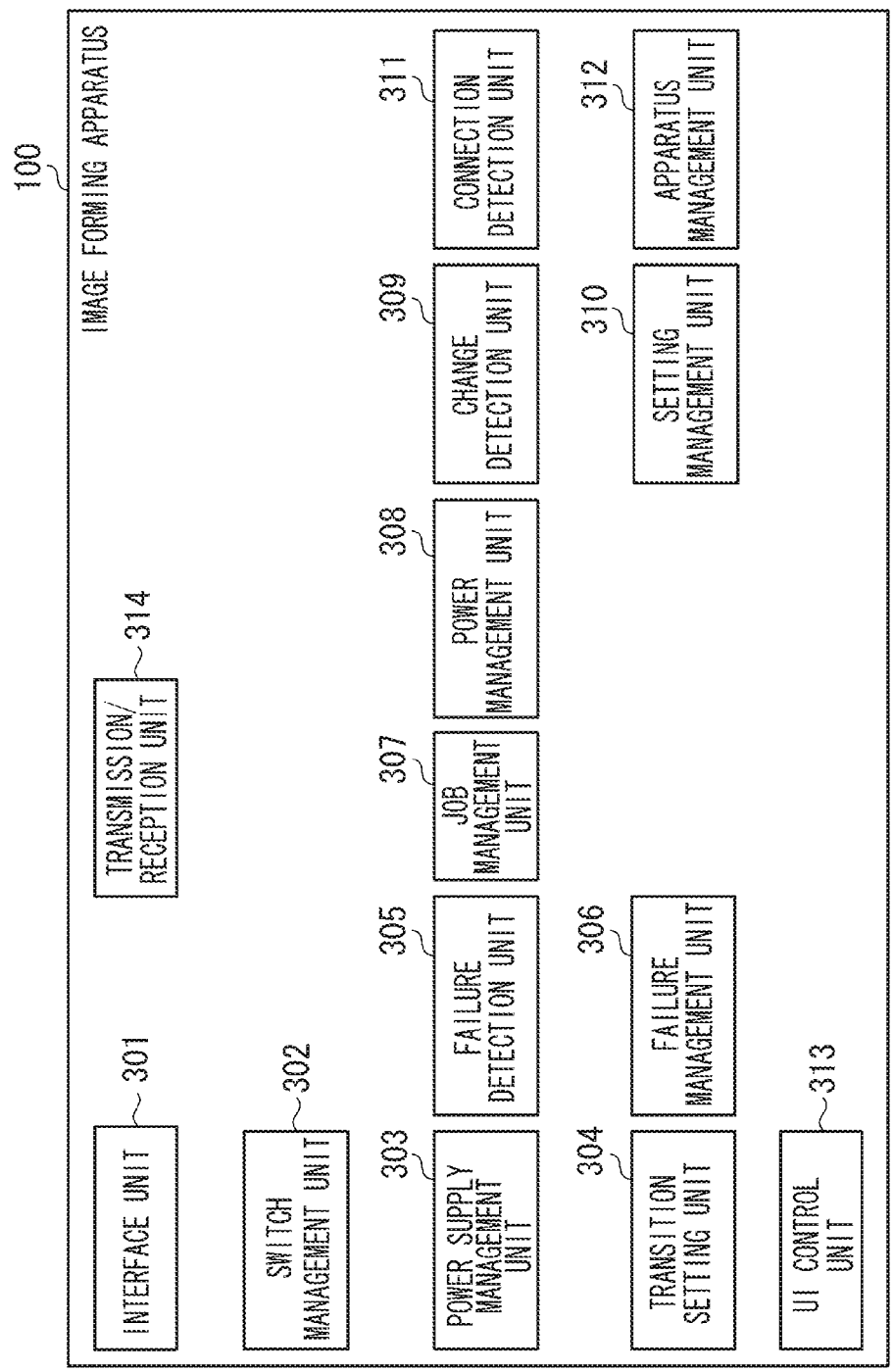

FIG. 2B is a block diagram illustrating an example of a functional configuration of the image forming apparatus 100.

An interface unit 301 is connected to an external apparatus such as a host computer via a network. A switch management unit 302 detects that the user has operated the switch unit 215. A power supply management unit 303 performs control to start the image forming apparatus 100. In a case where the image forming apparatus 100 starts in a power-off state, the power supply management unit 303 determines whether the image forming apparatus 100 is to shift to a state (standby state) where power is supplied to all devices in the image forming apparatus 100 or to a state (sleep state) where power is supplied to only a minimum required number of devices in the image forming apparatus 100 after performing initialization, and the image forming apparatus shifts to the determined state. A transition setting unit 304 changes a transition setting of a power supply state according to a state of the image forming apparatus 100. A failure detection unit 305 detects a failure that has occurred within the image forming apparatus 100. The failure detection unit 305 also detects that the failure has been resolved. A failure management unit 306 determines whether the image forming apparatus 100 needs to shift to the standby state after being restarted to resolve the failure that has occurred.

A job management unit 307 manages the number of jobs processed by the image forming apparatus 100, and compares the counted number of jobs with a prescribed value. A power management unit 308 acquires Lifetime power consumption of the image forming apparatus 100, and compares the acquired Lifetime power consumption with the value acquired last time. The Lifetime power consumption is a value defined by "PWG Imaging System Power MIB", which represents Lifetime power consumption of a system main body or each unit. The "PWG Imaging System Power MIB" is a Management Information Base (MIB) standard established by The Printer Working Group (PWG). A change detection unit 309 detects whether settings of various modes which are not reflected unless the image forming apparatus 100 shifts to the standby state once, have been changed, such as a network setting. A setting management unit 310 determines whether the image forming apparatus 100 needs to shift to the standby state after being restarted to reflect the changed setting.

A connection detection unit 311 detects whether an option apparatus has been connected to the main body of the image forming apparatus 100. An apparatus management unit 312 acquires apparatus configuration information, and performs various types of settings based on the acquired information. A user interface (UI) control unit 313 detects an event operated from a UI panel in the image forming apparatus 100, manages transition to another screen and set information. A transmission/reception unit 314 transmits and receives data to and from the management apparatus 101 via the network 102.

Figure 4:
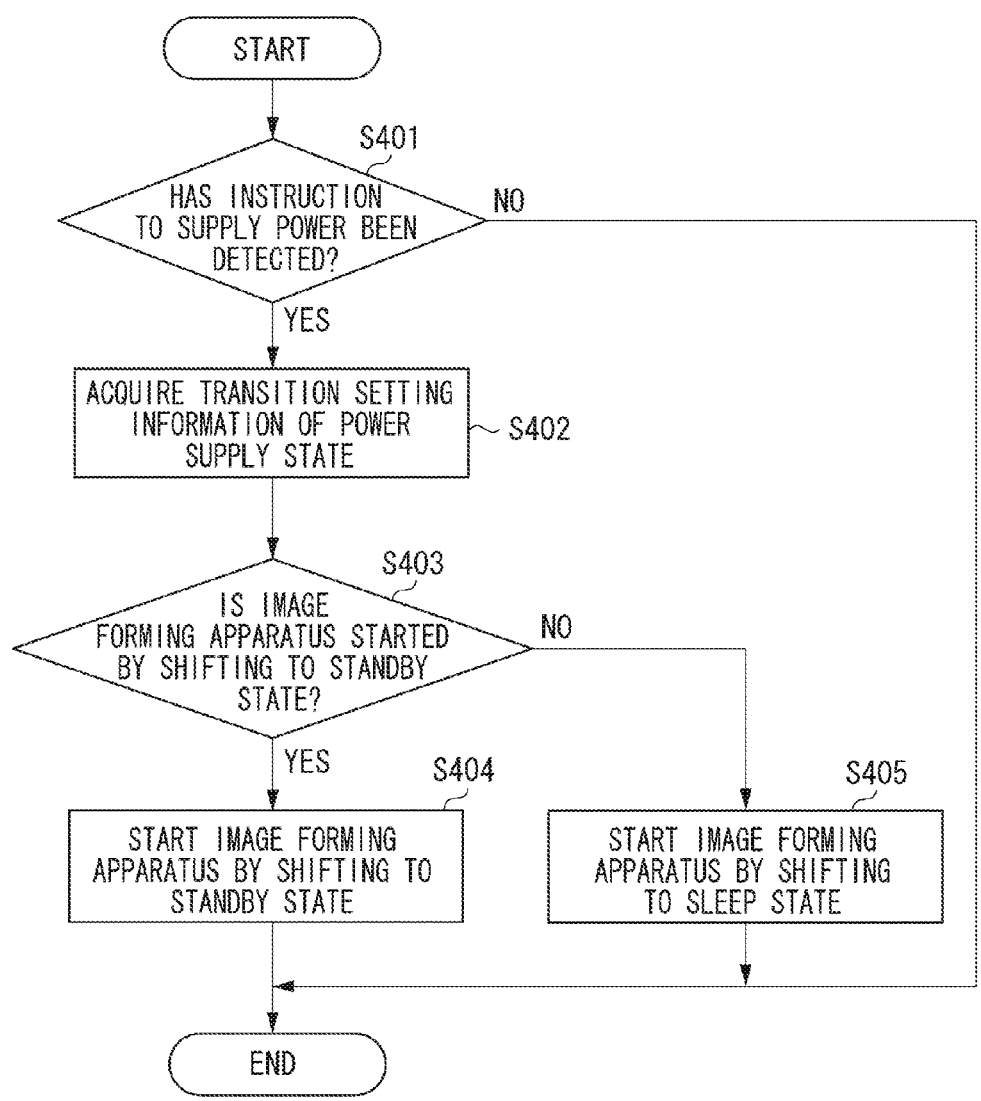
FIG. 4 is a flowchart of processing at the start of the image forming apparatus.

FIG. 4 is a flowchart illustrating an example of processing during the start of the image forming apparatus 100.

In step S401, the switch management unit 302 determines whether the user has performed a switch operation, and an instruction to supply power from a power-off state has been detected. If it is determined that the instruction to supply power has been detected (YES in step S401), the processing proceeds to step S402. In step S402, the power management unit 303 acquires transition setting information about a power supply state. The transition setting information of the power supply state is information indicating whether the image forming apparatus 100 is started in the power-off state to shift to a sleep state or to a standby state. In step S403, the power supply management unit 303 acquires the transition setting information about the power supply state, and determines whether the image forming apparatus 100 is started to shift to the standby state or to the sleep state based on the acquired information. If the image forming apparatus 100 is started to shift to the standby state, the processing proceeds to step S404. On the other hand, if the image forming apparatus 100 is started to shift to the sleep state, the processing proceeds to step S405. In step S404, the power supply management unit 303 starts the image forming apparatus 100 by shifting to the standby state based on the transition setting information about the power supply state. In step S405, the power supply management unit 303 is started by shifting to the sleep state based on the transition setting information about the power supply state.

Figure 5:
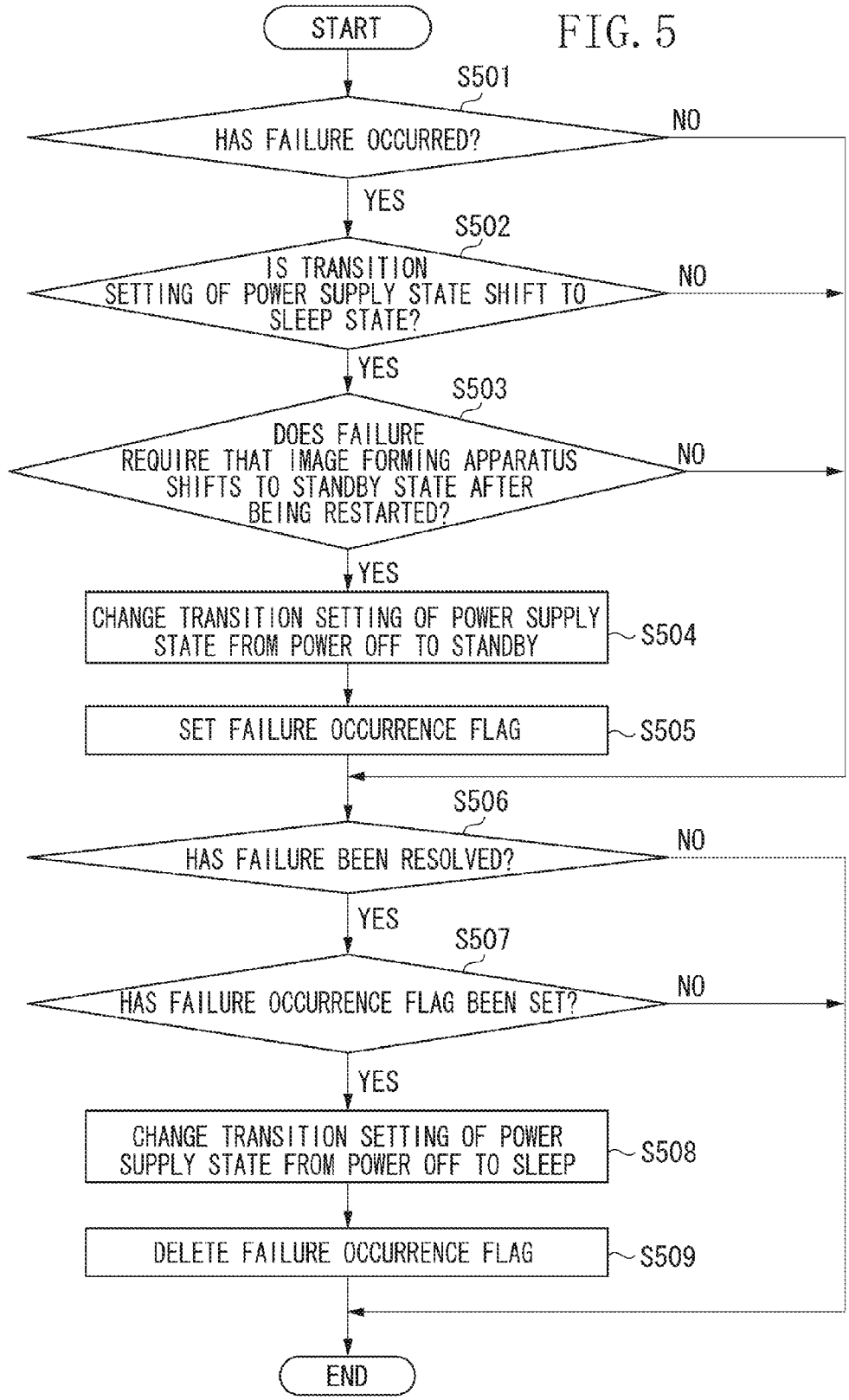
FIG. 5 is a flowchart of processing for changing a transition setting in a first exemplary embodiment.

FIG. 5 is a flowchart illustrating processing for changing a transition setting of a power supply state. More specifically, FIG. 5 is a flowchart for changing the transition setting of the power supply state when a failure has occurred and the failure has been resolved.

In step S501, the failure detection unit 305 detects whether a failure (e.g., a paper jam, a toner-out error, or a service call error) has occurred within the image forming apparatus 100. If it is detected that the failure has occurred (YES in step S501), the processing proceeds to step S502. In step S502, the transition setting unit 304 determines whether the current transition setting of the power supply state is shift to a sleep state. If it is determined that the current transition setting is shift to the sleep state (YES in step S502), the processing proceeds to step S503. In step S503, the failure management unit 306 determines whether the failure, which has been detected in step S501, requires that the image forming apparatus 100 shifts to a standby state after being restarted. As a method for making the determination, a list of codes of failures is previously held which require that the image forming apparatus 100 shifts to the standby state. A code of the failure that has occurred is compared with information about the held list of codes. If it is determined that the failure requires that the image forming apparatus 100 shifts to the standby state (YES in step S503), the processing proceeds to step S504. In step S504, the transition setting unit 304 changes the transition setting of the power supply state to the shift to the standby state. In step S505, the transition setting unit 304 sets a failure occurrence flag in a storage unit such as a HDD or a memory.

In step S506, the failure detection unit 305 detects whether the failure, which has occurred in the image forming apparatus 100, has been resolved. If it is detected that the failure has been resolved (YES in step S506), the processing proceeds to step S507. In step S507, the transition setting unit 304 determines whether the failure occurrence flag has been set. If it is determined that the failure occurrence flag has been set (YES in step S507), the processing proceeds to step S508. In step S508, the transition setting unit 304 changes the transition setting of the power supply state to the shift to the sleep state. In step S509, the transition setting unit 304 deletes the failure occurrence flag stored in the storage unit.

As described above, some failures, which have occurred in the image forming apparatus 100, may not be resolved unless the image forming apparatus shifts to the standby state after being restarted. In such a case, if the transition setting of the power supply state is the shift to the sleep state, the image forming apparatus 100 shifts to the sleep state after being restarted. Thus, the failure cannot be immediately resolved. Such a problem can be solved by dynamically changing the transition setting of the power supply state according to the failure that has occurred.

Modified Example 1

Another example of processing for changing a transition setting of a power supply state will be described. In a modified example 1 of the first exemplary embodiment, a transition setting of a power supply state is changed depending on a use status of the image forming apparatus 100.

Figure 7:
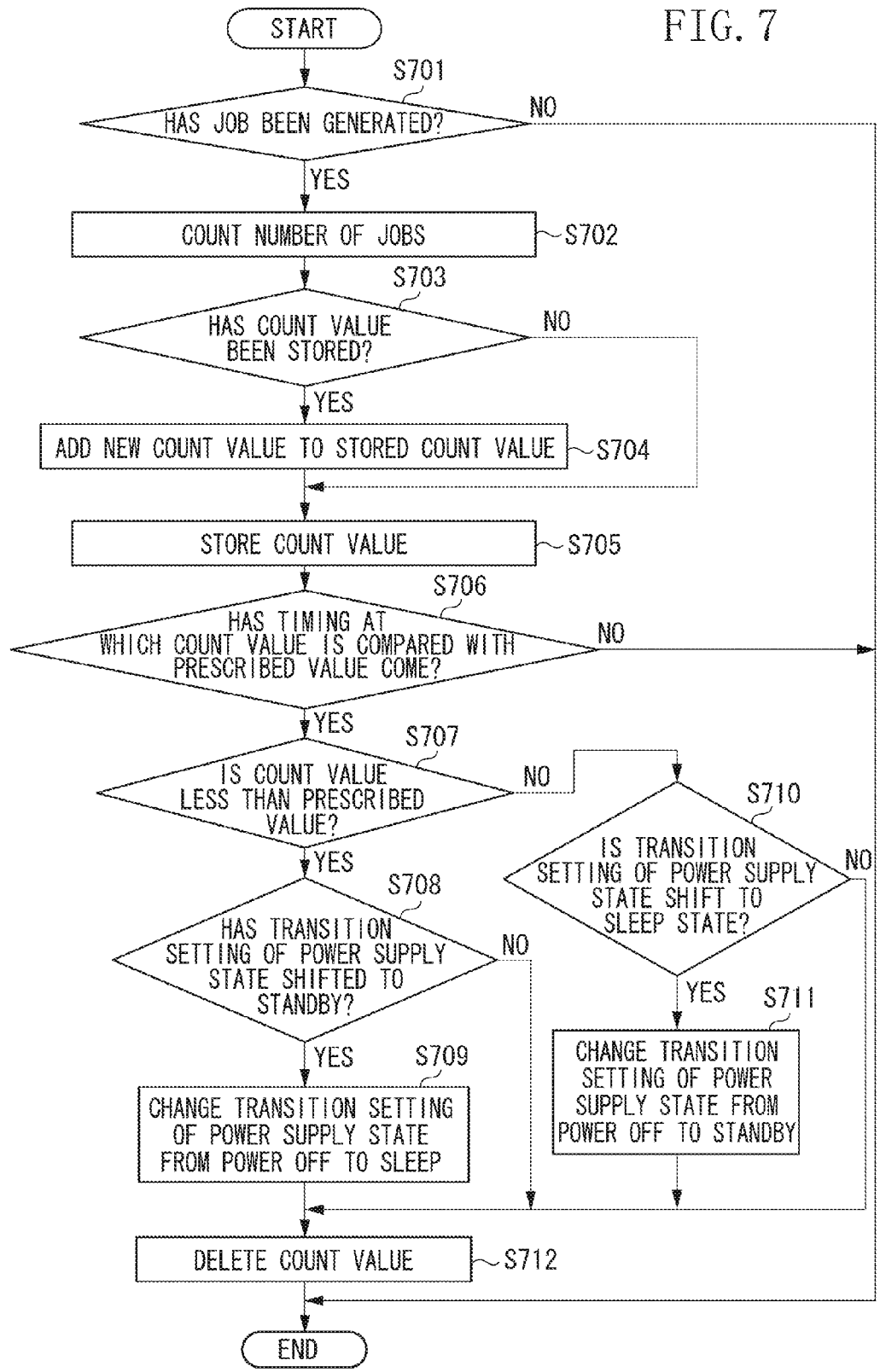
FIG. 7 is a flowchart of processing for changing a transition setting in a modified example 1 of the first exemplary embodiment.

FIG. 7 is a flowchart illustrating processing for changing the transition setting of the power supply state.

In step S701, the job management unit 307 detects that any job has been generated, to count the number of jobs generated per day. If it is detected that the job has been generated (YES in step S701), the processing proceeds to step S702. In step S702, the job management unit 307 counts the number of generated jobs. In step S703, the job management unit 307 checks whether a count value is stored in a storage unit such as a HDD or a memory. if it is determined that the count value is stored (YES in step S703), the processing proceeds to step S704. In step S704, the job management unit 307 adds a new count value and the count value already stored together, and counts the number of jobs generated per day. In step S705, the job management unit 307 stores the count value in the storage unit such as the HDD or the memory. In step S706, the job management unit 307 determines whether a timing at which the stored count value is compared with a previously determined prescribed value (e.g., once per day) has come. If it is determined that the comparison timing has come (YES in step S706), the processing proceeds to step S707.

In step S707, the job management unit 307 compares the stored count value (the total number of jobs generated per day) with the previously determined prescribed value, and determines whether the stored count value is less than the prescribed value. If it is determined that the stored count value is less than the prescribed value (YES in step S707), the processing proceeds to step S708. On the other hand, if it is determined that the stored count value is the prescribed value or more (NO in step S707), the processing proceeds to step S710. In step S708, the transition setting unit 304 determines whether the current transition setting of the power supply state is shift to a standby state. If it is determined that the transition setting is the shift to the standby state (YES in step S708), the processing proceeds to step S709. On the other hand, if it is determined that the transition setting is not the shift to the standby state (NO in step S708), the processing proceeds to step S712. In step S709, the transition setting unit 304 changes the transition setting of the power supply state to the shift to a sleep state.

In step S710, the transition setting unit 304 determines whether the current transition setting of the power supply state is the shift to the sleep state. If it is determined that the transition setting is the shift to the sleep state (YES in step S710), the processing proceeds to step S711. On the other hand, if it is determined that the transition setting is not the shift to the sleep state (NO in step S710), the processing proceeds to step S712. In step S711, the transition setting unit 304 changes the transition setting of the power supply state to the shift to the standby state. In step S712, the job management unit 307 deletes the count value stored in the storage unit.

As described above, wasteful power consumption can be reduced by dynamically changing the transition setting of the power supply state depending on the use status of the image forming apparatus 100.

Modified Example 2

Another example of processing for changing a transition setting of a power supply state will be described. In a modified example 2 of the first exemplary embodiment, a transition setting of a power supply state is changed depending on a power status of the image forming apparatus 100.

Figure 8:
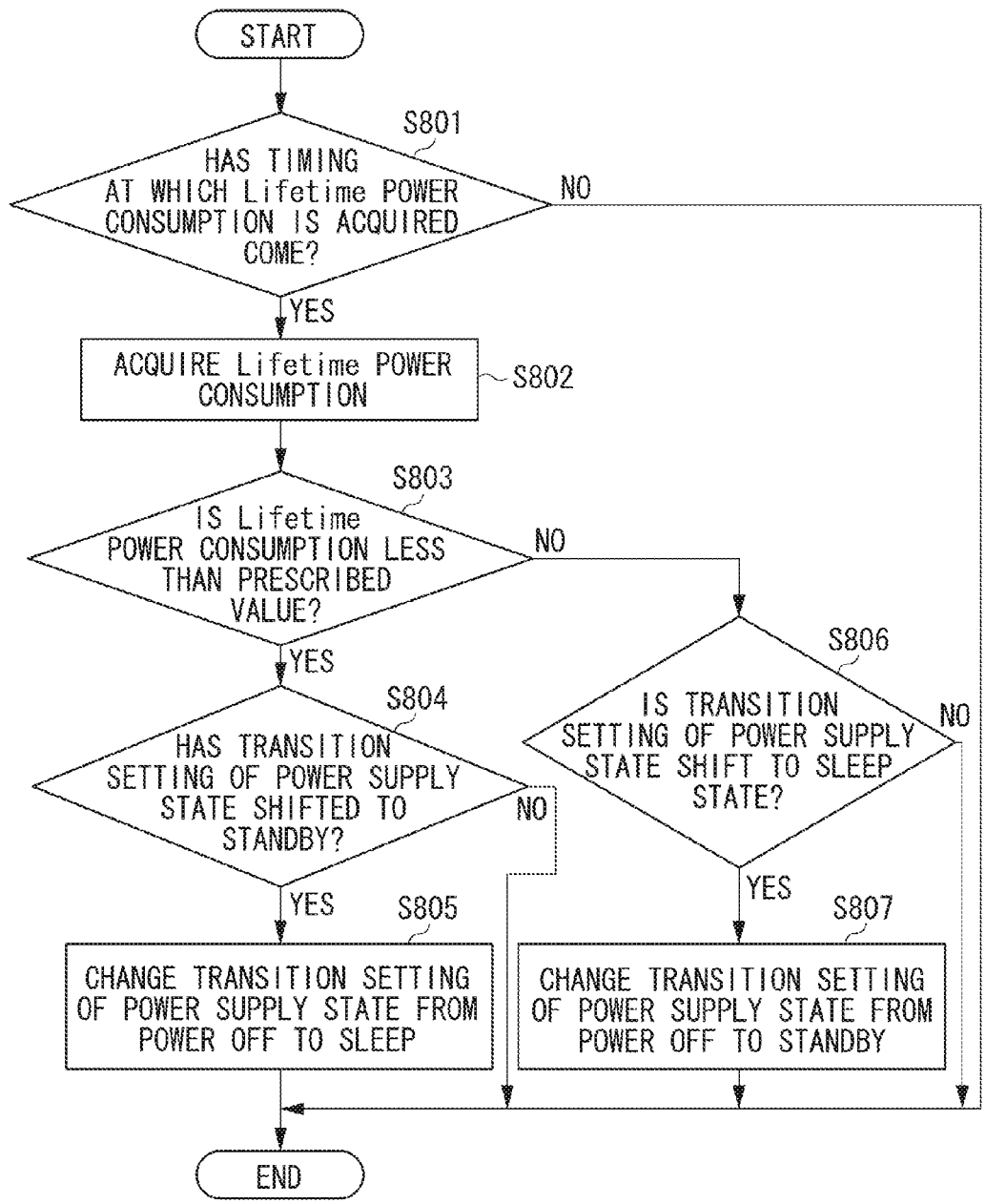
FIG. 8 is a flowchart of processing for changing a transition setting in a modified example 2 of the first exemplary embodiment.

FIG. 8 is a flowchart illustrating processing for changing the transition setting of the power supply state.

In step S801, the power management unit 308 determines whether a timing at which Lifetime power consumption is acquired has come. If it is determined that the acquisition timing has come (YES in step S801), the processing proceeds to step S802. In step S802, the power management unit 308 acquires Lifetime power consumption. In step S803, the power management unit 308 compares the acquired Lifetime power consumption with a previously determined prescribed value, and determines whether the acquired Lifetime power consumption is less than the prescribed value. If it is determined that the acquired Lifetime power consumption is less than the prescribed value (YES in step S803), the processing proceeds to step S804. On the other hand, if the acquired Lifetime power consumption is the prescribed value or more (NO in step S803), the processing proceeds to step S806.

In step S804, the transition setting unit 304 determines whether the current transition setting of the power supply state is shift to a standby state. If it is determined that the transition setting is the shift to the standby state (YES in step S804), the processing proceeds to step S805. In step S805, the transition setting unit 304 changes the transition setting of the power supply state to the shift to a sleep state. In step S806, the transition setting unit 304 determines whether the current transition setting of the power supply state is the shift to the sleep state. If it is determined that the transition setting is the shift to the sleep state (YES in step S806), the processing proceeds to step S807. In step S807, the transition setting unit 304 changes the transition setting of the power supply state to the shift to the standby state.

As described above, wasteful power consumption can be reduced by dynamically changing the transition setting of the power supply state depending on the power status of the image forming apparatus 100.

Modified Example 3

Another example of processing for changing a transition setting of a power supply state will be described. In a modified example 3 of the first exemplary embodiment, a transition setting of a power supply state is changed depending on the setting change.

Figure 9:
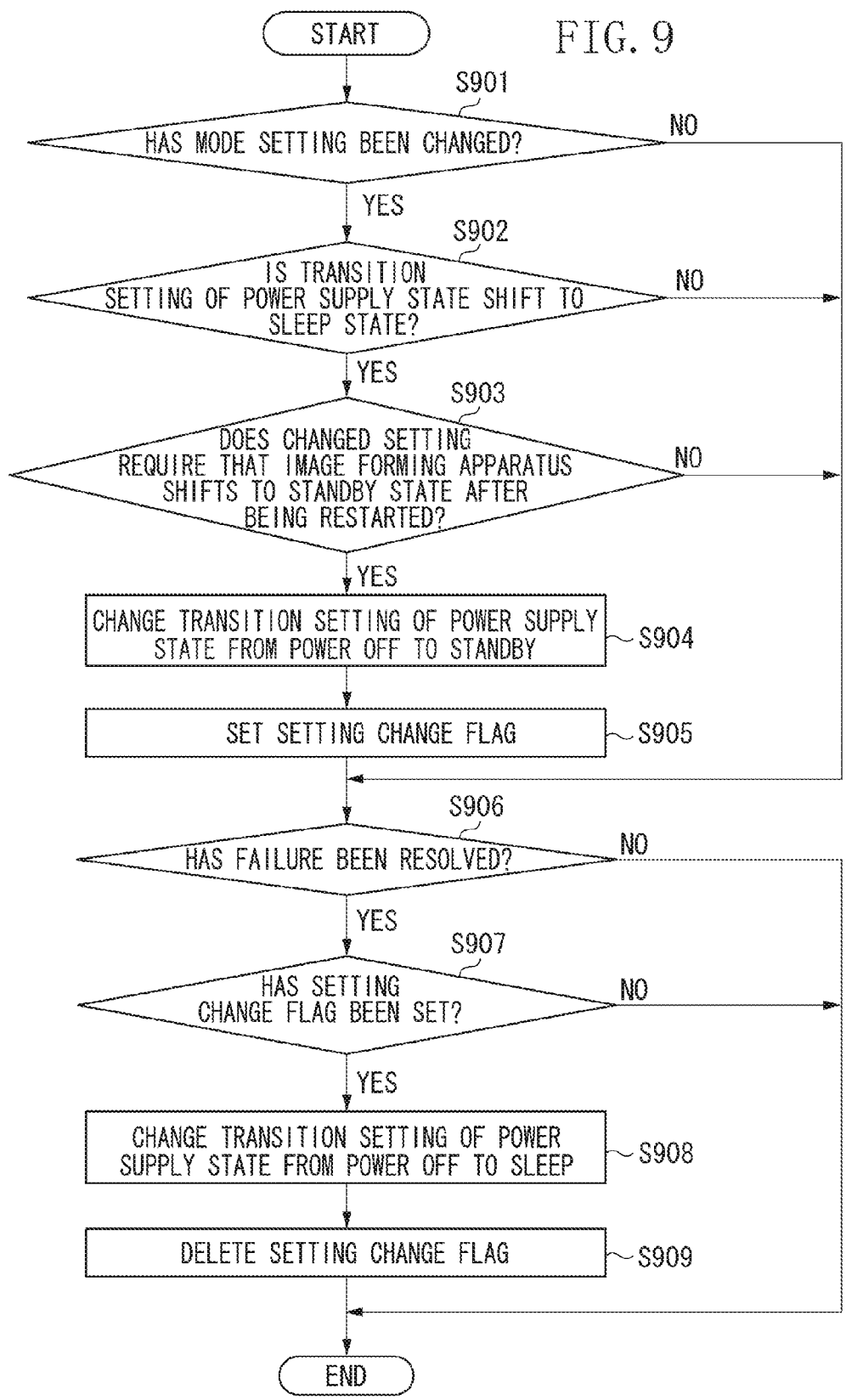
FIG. 9 is a flowchart of processing for changing a transition setting in a modified example 3 of the first exemplary embodiment.

FIG. 9 is a flowchart illustrating processing for changing the transition setting of the power supply state.

In step S901, the change detection unit 309 detects whether a setting (e.g., a network setting) of various modes (e.g., a user mode and a service mode) has been changed. If it is detected that the setting has been changed (YES in step S901), the processing proceeds to step S902. In step S902, the transition setting unit 304 confirms whether the current transition setting of the power supply state is shift to a sleep state. If it is determined that the transition setting is the shift to the sleep state (YES in step S902), the processing proceeds to step S903. In step S903, the setting management unit 310 determines whether the changed setting, which has been detected in step S901, requires that the image forming apparatus 100 shifts to a standby state after being restarted. As a determination method, a list of settings that require that the image forming apparatus 100 shifts to the standby state after the setting has been changed is previously retained, and the setting that has been changed by a user is compared with the settings retained in the list. If it is determined that the changed setting requires that the image forming apparatus 100 shifts to the standby state (YES in step S903), the processing proceeds to step S904. In step S904, the transition setting unit 304 changes the transition setting of the power supply state to the shift to the standby state. In step S905, the transition setting unit 304 sets a setting change flag in a storage unit such as a HDD or a memory.

In step S906, the change detection unit 309 detects whether a failure, which has occurred in the image forming apparatus 100, has been resolved. If it is detected that the failure has been resolved (YES in step S906), the processing proceeds to step S907. In step S907, the transition setting unit 304 determines whether the setting change flag has been set. If it is determined that the setting change flag has been set (YES in step S907), the processing proceeds to step S908. In step S908, the transition setting unit 304 changes the transition setting of the power supply state to the shift to the sleep state. In step S909, the transition setting unit 304 deletes the setting change flag stored in the storage unit.

As described above, wasteful power consumption can be reduced by detecting that various types of settings have been changed and dynamically changing the transition setting of the power supply state.

Modified Example 4

Another example of processing for changing a transition setting of a power supply state will be described. In a modified example 4 of the first exemplary embodiment, a transition setting of a power supply state is changed when an option apparatus (e.g., a finisher or a sample preparation apparatus) is connected thereto or when various types of settings are completed.

Figure 10:
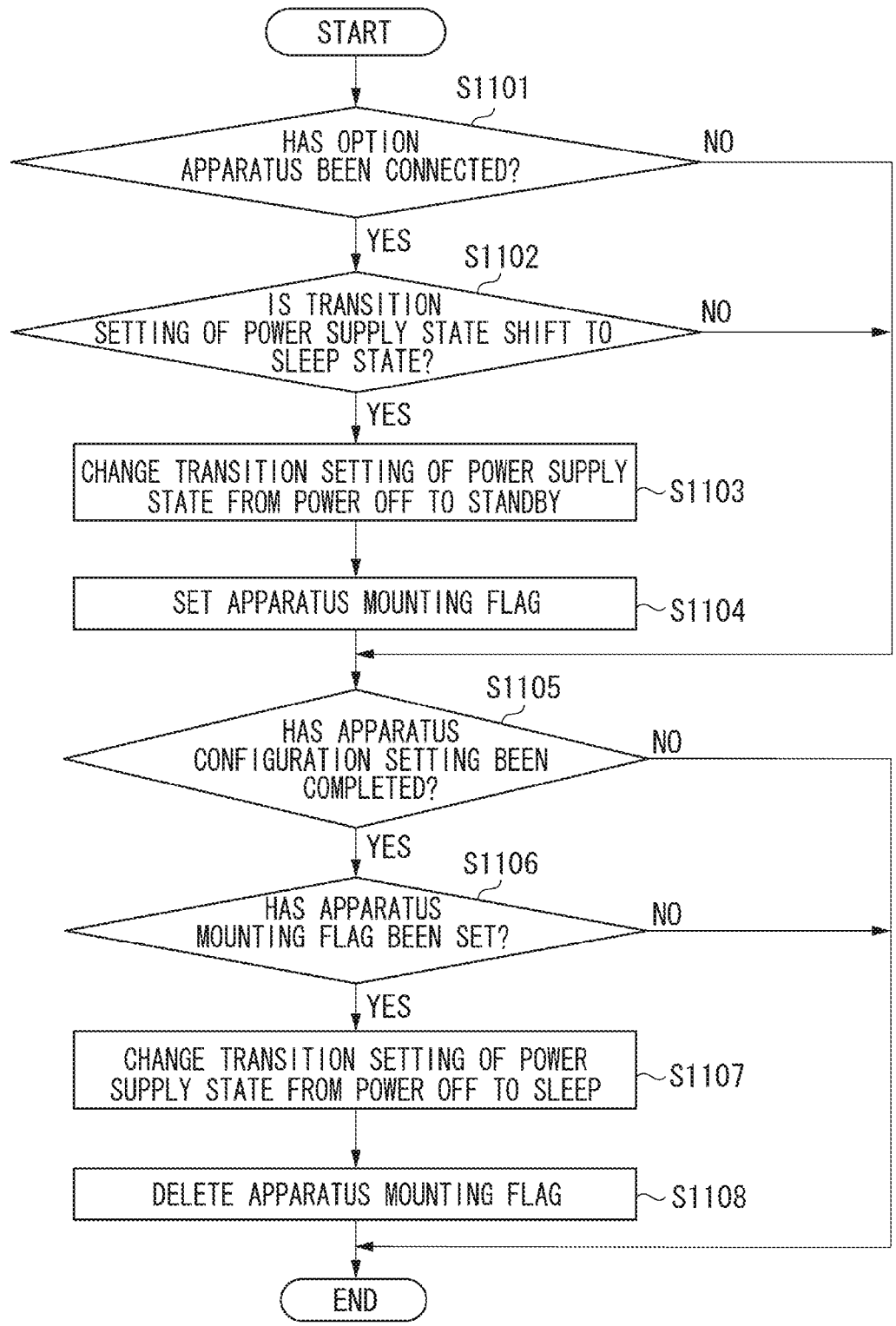
FIG. 10 is a flowchart of processing for changing a transition setting in a modified example 4 of the first exemplary embodiment.

FIG. 10 is a flowchart illustrating processing for changing the transition setting of the power supply state.

In step S1101, the connection detection unit 311 detects whether an external apparatus such as the option apparatus has been connected. If it is detected that the external apparatus has been connected (YES in step S1101), the processing proceeds to step S1102. In step S1102, the transition setting unit 304 determines whether the current transition setting of the power supply state is shift to a sleep state. If it is determined that the transition setting is the shift to the sleep state (YES in step S1102), the processing proceeds to step S1103. In step S1103, the transition setting unit 304 changes the transition setting of the power supply state to the shift to a standby state. In step S1104, the transition setting unit 304 sets an apparatus mounting flag in a storage unit such as a HDD or a memory.

In step S1105, the apparatus management unit 312 acquires apparatus configuration information, performs various types of required settings, and determines whether the required settings are completed. If the required settings are completed (YES in step S1105), the processing proceeds to step S1106. In step S1106, the transition setting unit 304 determines whether the apparatus mounting flag has been set. If it is determined that the apparatus mounting flag has been set (YES in step S1106), the processing proceeds to step S1107. In step S1107, the transition setting unit 304 changes the transition setting of the power supply state to the shift to the sleep state. In step S1108, the transition setting unit 304 deletes the apparatus mounting flag stored in the storage unit.

As described above, wasteful power consumption can be reduced by detecting that the option apparatus has been connected and dynamically changing the transition setting of the power supply state, as described above.

Modified Example 5

Another example of processing for changing a transition setting of a power supply state will be described. In a modified example 5 of the first exemplary embodiment, a transition setting of a power supply state is changed via a UI.

The UI control unit 313 detects that a setting operation has been carried out on a transition setting screen of the power supply state, and the transition setting unit 304 sets the transition setting of the power supply state based on the operated setting. FIG. 3 illustrates an example of the transition setting screen of the power supply state. The transition setting of the power supply state is made by a user performing a switch operation with a setting value on the screen. However, in "PWG Imaging System Power MIB", a function "Calendar" exists, which enables the image forming apparatus 100 to shift to a determined power supply state when a predetermined timing has come. For example, if the function "Calendar" is set, the image forming apparatus 100 preferentially shifts to the power supply state set with the function "Calendar". For example, it is assumed that a transition setting of a power supply state set on a UI screen is shift from a power-off state to a standby state. If the image forming apparatus 100 is set to shift from the power-off state to a sleep state at 8:30 every day to coincide with an opening time using the function "Calendar", the image forming apparatus shifts to the sleep state even when powered up at 8:30 every day.

As described above, effective power supply management can be performed by giving a priority to a method for setting various types of functions.

A second exemplary embodiment will be described below. While processing for changing the transition setting of the power supply state is performed in the image forming apparatus 100 in the first exemplary embodiment, processing for changing a transition setting of a power supply state is performed in a management apparatus in the present exemplary embodiment. A system configuration and a configuration of an image forming apparatus 100 are similar to those in the first exemplary embodiment, and hence description thereof is not repeated.

Figure 13A:
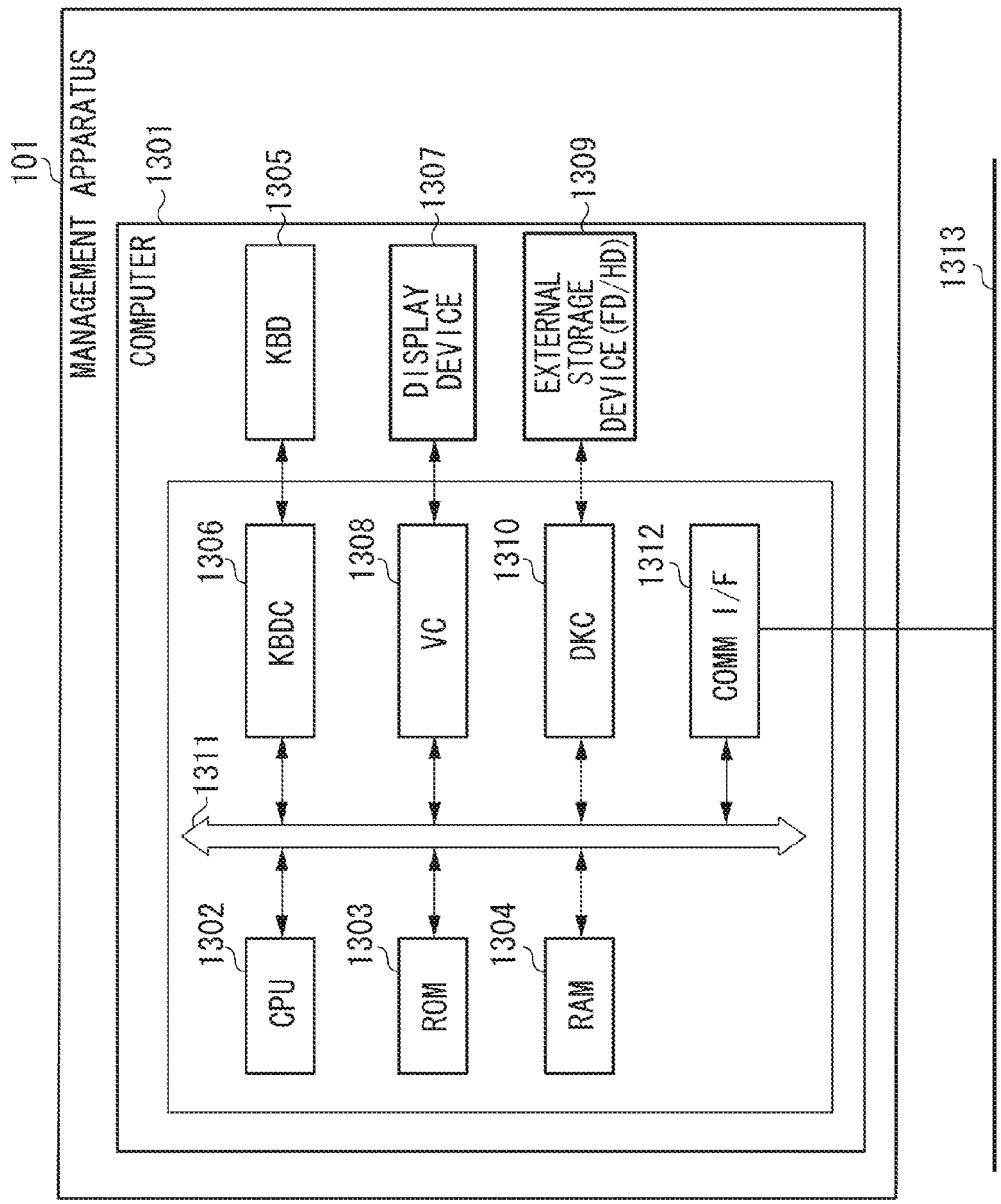
FIGS. 13A and 13B are block diagrams of a management apparatus.

FIG. 13A is a block diagram illustrating an example of an internal configuration of a management apparatus 101.

The management apparatus 101 includes a CPU 1302, a RAM 1301, a ROM 1304, and an external storage device 1309. The CPU 1303 executes software stored in the ROM 1304 or the external storage device 1309 or downloaded by a local area network (LAN) 1313, to integrally control devices connected to a system bus 1311. The RAM 1303 functions as a main memory or a work area for the CPU 1302. The external storage device 1309 includes a hard disk (HD) and a floppy disk (FD) (registered trademark). The external storage device 1309 stores various applications including a boot program, an operating system, an authentication server, an authentication client, database data, and a user file. Further, in the management apparatus 1301, a keyboard controller (KBDC) 1306 sends input information from a keyboard (KBD) 1305 and a pointing device (not illustrated) to the CPU 1302. A video controller (VC) 1308 controls display on a display device 1307 including a cathode ray tube (CRT) and a line drop compensator (LDC). A disk controller (DKC) 1310 controls access to the external storage device 1309, and is connected to the LAN 1313 via a communication controller (COMM I/F) 1312.

Figure 13B:
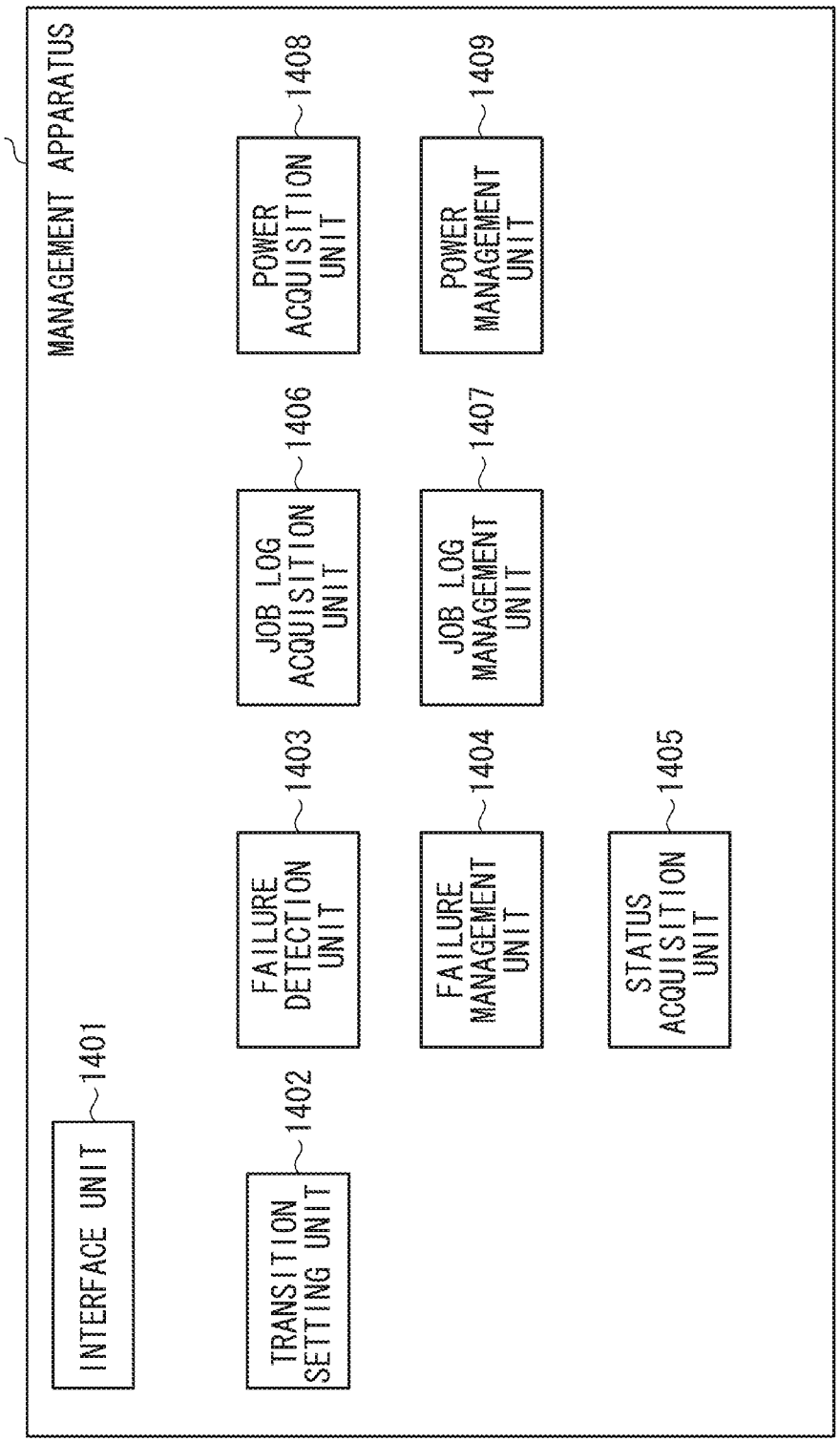

FIG. 13B is a block diagram illustrating an example of a functional configuration of the management apparatus 101.

An interface unit 1401 is connected to an external apparatus such as an image forming apparatus 100 via a network. A transition setting unit 1402 acquires a transition setting of a power supply state from the image forming apparatus 100, and issues an instruction to change the transition setting of the power supply state. A failure detection unit 1403 acquires a failure occurrence notification from the image forming apparatus 100. A failure detection unit 1404 determines whether the image forming apparatus 100 needs to shift to a standby state after being restarted, to solve a failure that has occurred. A status acquisition unit 1405 acquires status information such as a failure status from the image forming apparatus 100. A job log acquisition unit 1406 acquires a job log from the image forming apparatus 100. A job log management unit 1407 counts the number of acquired job logs, and compares the counted number of job logs with a previously determined prescribed value. A power acquisition unit 1408 acquires Lifetime power consumption from the image forming apparatus 100. The Lifetime power consumption is as described in a third exemplary embodiment. A power management unit 1409 compares the Lifetime power consumption with the previously determined prescribed value.

Figure 6:
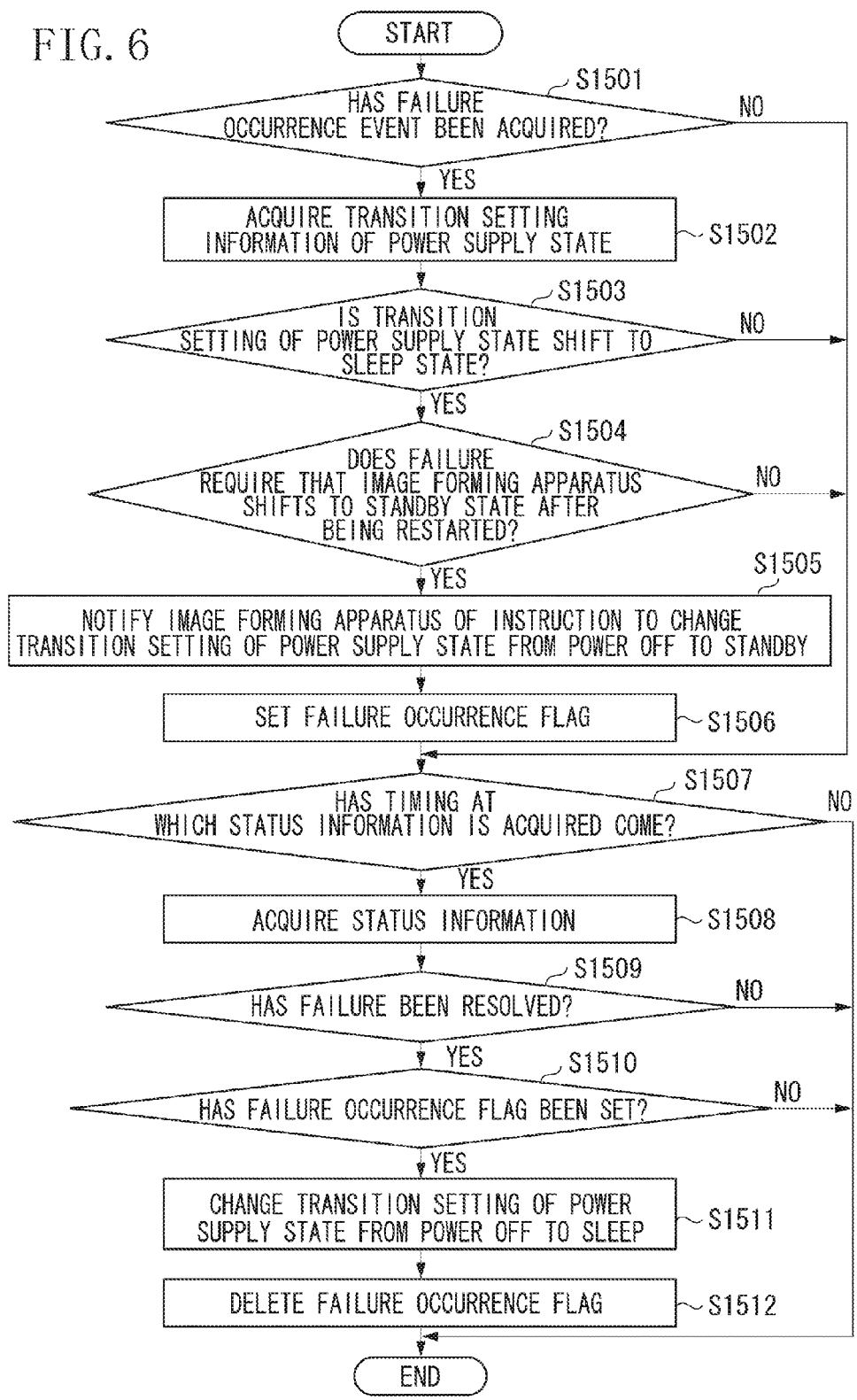
FIG. 6 is a flowchart of processing for changing a transition setting in a second exemplary embodiment.

FIG. 6 is a flowchart illustrating processing for changing a transition setting of a power supply state, and specifically a flowchart for changing the transition setting of the power supply state when a failure has occurred and the failure has been resolved.

In step S1501, the failure detection unit 1403 determines whether a failure occurrence event has been acquired from the image forming apparatus 100. If it is determined that the failure occurrence event has been acquired (YES in step S1501), the processing proceeds to step S1502. In step S1502, the transition setting unit 1402 acquires transition setting information of the power supply state from the image forming apparatus 100. In step S1503, the transition setting unit 1402 determines whether the current transition setting of the power supply state is shift to a sleep state. If it is determined that the transition setting is the shift to the sleep state (YES in step S1503), the processing proceeds to step S1504. In step S1504, the failure management unit 1404 determines whether the failure, which has been detected in step S1501, requires that the image forming apparatus 100 shifts to a standby state after being restarted. If it is determined that the failure requires that the image forming apparatus 100 shifts to the standby state (YES in step S1504), the processing proceeds to step S1505. In step S1505, the transition setting unit 1402 instructs the image forming apparatus 100 to change the transition setting of the power supply state to the shift to the standby state. In step S1506, the transition setting unit 1402 sets a failure occurrence flag in a storage unit such as a HDD or a memory.

In step S1507, the status acquisition unit 1405 determines whether a timing at which status information indicating a failure status is acquired from the image forming apparatus 100 has come. If it is determined that the acquisition timing has come (YES in step S1507), the processing proceeds to step S1508. In step S1508, the status acquisition unit 1405 acquires the status information from the image forming apparatus 100. In step S1509, the failure management unit 1404 determines whether the failure has been resolved. If it is determined the failure has been resolved (YES in step S1509), the processing proceeds to step S1510. In step S1510, the transition setting unit 1402 determines whether the failure occurrence flag has been set. If it is determined that the failure occurrence flag has been set (YES in step S1510), the processing proceeds to step S1511. In step S1511, the transition setting unit 1402 instructs the image forming apparatus 100 to change the transition setting of the power supply state to the shift to the sleep state. In step S1512, the transition setting unit 1402 deletes the failure occurrence flag stored in the storage unit.

In the image forming apparatus 100, the transition setting unit 304 changes the transition setting information based on the instruction to change the transition setting, of which the image forming apparatus 100 has been notified in step S1505 or S1511, and the power supply management unit 303 performs control to start the image forming apparatus 100 using the changed transition setting information.

As described above, processing for changing the transition setting in the image forming apparatus 100 illustrated in the first exemplary embodiment can also be performed in the management apparatus 101.

Modified Example 1

Another example of processing for changing a transition setting of a power supply state will be described. In a modified example 1 of the second exemplary embodiment, the management unit 101 changes a transition setting of a power supply state depending on a use status of the image forming apparatus 100.

Figure 11:
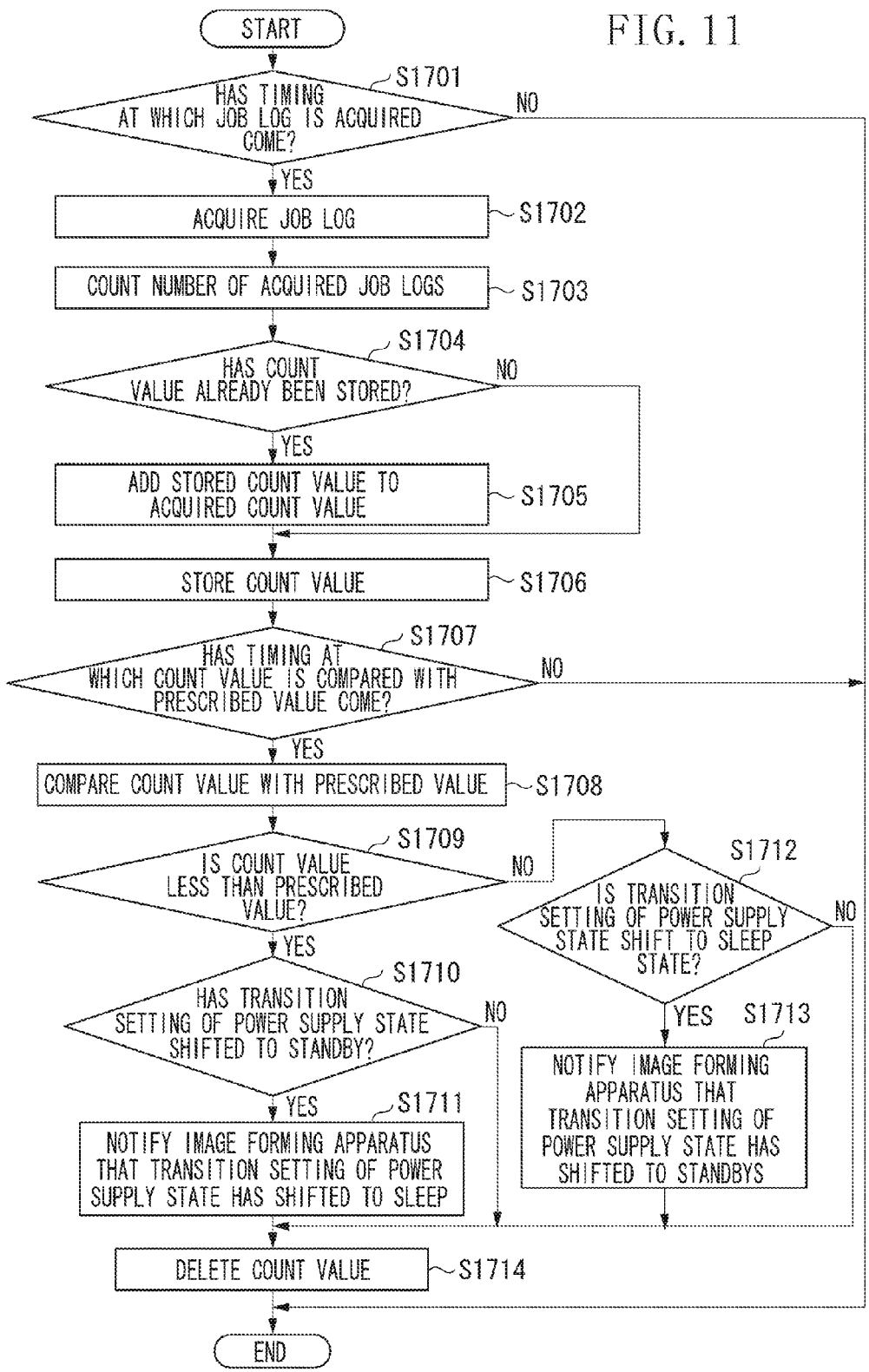
FIG. 11 is a flowchart of processing for changing a transition setting in a modified example 1 of the second exemplary embodiment.

FIG. 11 is a flowchart illustrating processing for changing the transition setting of the power supply state.

In step S1701, the job log acquisition unit 1406 determines whether a timing at which a job log is acquired from the image forming apparatus 100 has come. If the acquisition timing has come (YES in step S1701), the processing proceeds to step S1702. In step S1702, the job log acquisition unit 1406 acquires the job log from the image forming apparatus 100. In step S1703, the job log management unit 1407 counts the number of acquired job logs.

In step S1704, the job log management unit 1407 determines whether a count value is stored in a storage unit. If it is determined that the count value is stored (YES in step S1704), the processing proceeds to step S1705. On the other hand, if it is determined that the count value is not stored (NO in step S1704), the processing proceeds to step S1706.

In step S1705, the job log management unit 1407 adds the stored count value and the acquired count value together. In step S1706, the job log management unit 1407 stores the count value in the storage unit. In step S1707, the job log management unit 1407 determines whether a timing at which the stored count value is compared with a previously determined prescribed value has come. If it is determined that the compassion timing has come (YES in step S1707), the processing proceeds to step S1708. In step S1708, the job log management unit 1407 compares the stored count value with the previously determined prescribed value. In step S1709, the job log management unit 1407 determines whether the stored count value is less than the prescribed value. If it is determined that the stored count value is less than the prescribed value (YES in step S1709), the processing proceeds to step S1710. If it is determined that the count value is the prescribed value or more (NO in step S1710), the processing proceeds to step S1712.

In step S1710, the transition setting unit 1402 determines whether the current transition setting of the power supply state is shift to a standby state. If it is determined that the transition setting is the shift to the standby state (YES in step S1710), the processing proceeds to step S1711. In step S1711, the transition setting unit 1402 changes the transition setting of the power supply state to the shift to a sleep state, and notifies the image forming apparatus 100 of the change. In step S1712, the transition setting unit 1402 determines whether the current transition setting of the power supply is the shift to the sleep state. If it is determined that the transition setting is the shift to the sleep state (YES in step S1712), the processing proceeds to step S1713. In step S1713, the transition setting unit 1402 changes the transition setting of the power supply state to the shift to the standby state, and notifies the image forming apparatus 100 of the change. In step S1714, the job log management unit 1407 deletes the count value stored in the storage unit.

In the image forming apparatus 100, the transition setting unit 304 changes transition setting information based on the change of the transition setting, of which the image forming apparatus 100 has been notified in step S1711 or S1713, and the power supply management unit 303 performs control to start the image forming apparatus 100 using the changed transition setting information.

Modified Example 2

Another example of processing for changing a transition setting of a power supply state will be described. In a modified example 2 of the second exemplary embodiment, the management apparatus 101 changes a transition setting of a power supply state depending on a power status of the image forming apparatus 100.

Figure 12:
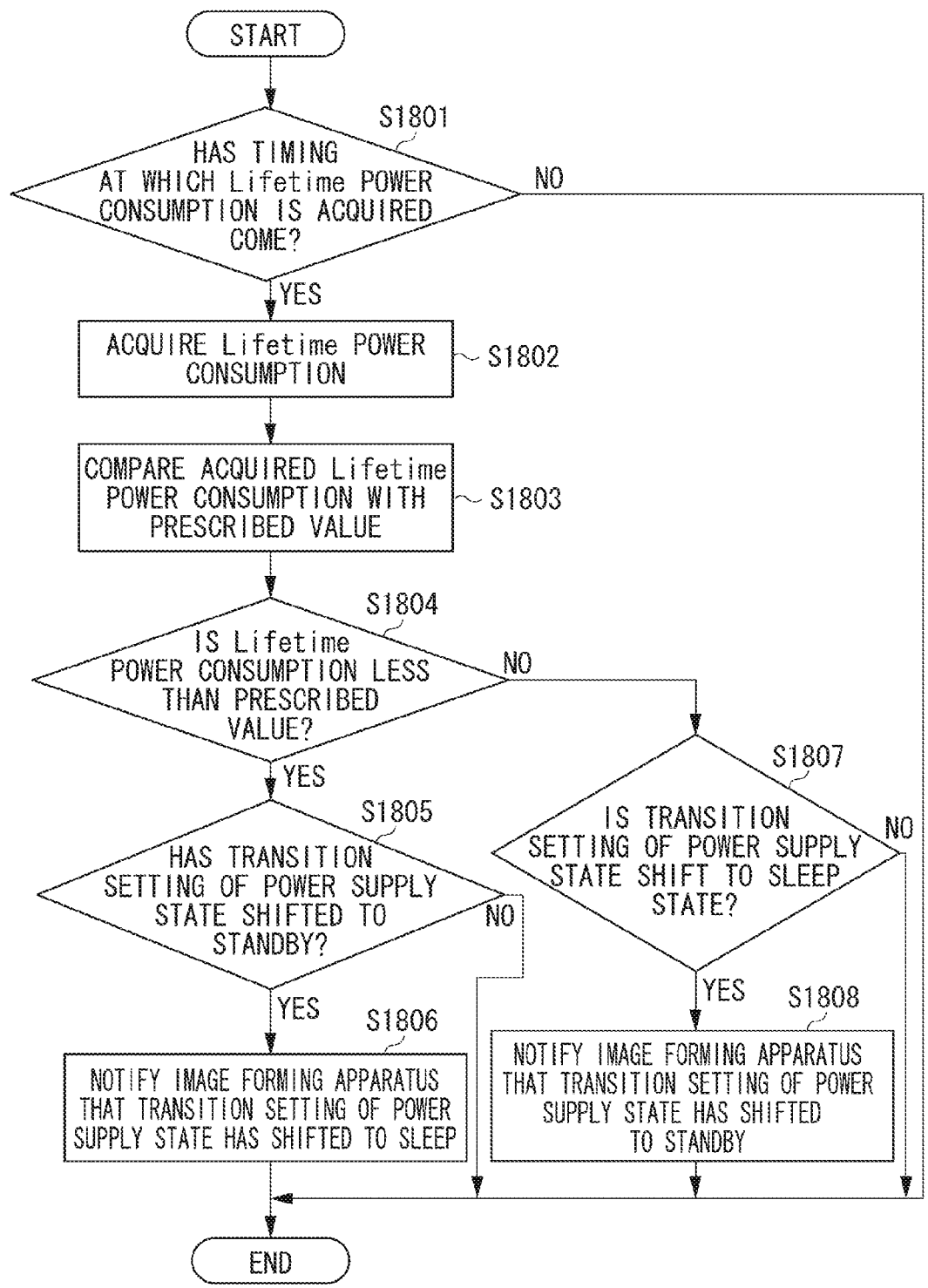
FIG. 12 is a flowchart of processing for changing a transition setting in a modified example 2 of the second exemplary embodiment.

FIG. 12 is a flowchart illustrating processing for changing the transition setting of the power supply state.

In step S1801, the power acquisition unit 1408 determines whether a timing at which Lifetime power consumption is acquired from the image forming apparatus 100 has come. If the acquired timing has come (YES in step S1801), the processing proceeds to step S1802. In step S1802, the power acquisition unit 1408 acquires the Lifetime power consumption from the image forming apparatus 100. In step S1803, the power management unit 1409 compares the acquired Lifetime power consumption with a previously determined prescribed value. In step S1804, the power management unit 1409 determines whether the acquired Lifetime power consumption is less than the prescribed value. If it is detected that the acquired Lifetime power consumption is less than the prescribed value (YES in step S1804), the processing proceeds to step S1805. On the other hand, if the acquired Lifetime power consumption is the prescribed value or more (NO in step S1804), the processing proceeds to step S1807.

In step S1805, the transition setting unit 1402 determines whether the current transition setting of the power supply state is shift to a standby state. If it is determined that the transition setting is the shift to the standby state (YES in step S1805), the processing proceeds to step S1806. In step S1806, the transition setting unit 1402 changes the transition setting of the power supply state to the shift to a sleep state, and notifies the image forming apparatus 100 of the change. In step S1807, the transition setting unit 1402 determines whether the current transition setting of the power supply state is the shift to the sleep state. If it is determined that the transition setting is the shift to the sleep state (YES in step S1807), the processing proceeds to step S1808. In step S1808, the transition setting unit 1402 changes the transition setting of the power supply state to the shift to the standby state, and notifies the image forming apparatus 100 of the change.

In the image forming apparatus 100, the transition setting unit 304 changes transition setting information based on the change of the transition setting, of which the image forming apparatus 100 has been notified in step S1806 or S1808, and the power supply management unit 303 performs control to start the image forming apparatus 100 using the changed transition setting information.

According to the above-mentioned exemplary embodiment, wasteful power consumption can be suppressed when the image forming apparatus is powered up.

Other Embodiments

Additional embodiments can also be realized by a computer of a system or apparatus that reads out and executes computer executable instructions recorded on a storage medium (e.g., computer-readable storage medium) to perform the functions of one or more of the above-described embodiment(s), and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that these exemplary embodiments are not seen to be limiting. The scope of the following claims is to be accorded the broadest interpretation so as to encompass all such modifications and equivalent structures and functions.

This application claims the benefit of Japanese Patent Application No. 2014-118110, filed Jun. 6, 2014, which is hereby incorporated by reference herein in its entirety.

What is claimed is:
1. An image forming apparatus comprising:
a processor;

a retaining unit configured to retain transition information indicating that the image forming apparatus is started by shifting from a power-off state to a standby state or that the image forming apparatus is started by shifting from the power-off state to a sleep state;

a failure detection unit configured to detect that a failure has occurred in the image forming apparatus;

a determination unit configured to determine whether the transition information indicates that the image forming apparatus is started by shifting the power-off state to the sleep state, and whether the detected failure requires that the image forming apparatus shift to the standby state after being restarted;

a changing unit configured to change, in a case where the determination unit determines that the transition information indicates that the image forming apparatus is started by shifting the power-off state to the sleep state, and that the detected failure requires that the image forming apparatus shift to the sleep state after being restarted, the transition information so that the transition information indicates that the image forming apparatus is started by shifting the power-off state to the standby state;

a detection unit configured to detect an instruction to supply power in the power-off state of the image forming apparatus; and a control unit configured to perform control such that the image forming apparatus is started by shifting from the power-off state to the standby state or is started by shifting from the power-off state to the sleep state based on the transition information retained in the retaining unit when the detection unit detects the instruction to supply power to the image forming apparatus, wherein the processor implements the retaining unit, the failure detection unit, the determination unit, the changing unit, the detection unit, and the control unit.

2. The image forming apparatus according to claim 1, wherein the retaining unit retains, in a case where the changing unit has changed the transition information so that the transition information indicates that the image forming apparatus is started by shifting from the power-off state to the standby state, information indicating that the changing unit has changed the transition information.

3. The image forming apparatus according to claim 2, wherein the failure detection unit further detects that a failure has been resolved in the image forming apparatus, and wherein, in a case where the failure detection unit detects that a failure has been resolved in the image forming apparatus, and the retaining unit retains the information indicating that the changing unit has changed the transition information, the changing unit changes the transition information so that the transition information indicates that the image forming apparatus is started by shifting the power-off state to the sleep state.

4. The image forming apparatus according to claim 3, wherein, in a case where the changing unit has changed the transition information so that the transition information indicates that the image forming apparatus is started by shifting the power-off state to the sleep state, the changing unit deletes the information indicating that the changing unit has changed the transition information, which is retained in the retaining unit.

5. A method for controlling an image forming apparatus, the method comprising:

retaining transition information indicating that the image forming apparatus is started by shifting from a power-off state to a standby state or that the image forming apparatus is started by shifting from the power-off state to a sleep state;

detecting that a failure has occurred in the image forming apparatus;

determining, using a processor, whether the transition information indicates that the image forming apparatus is started by shifting the power-off state to the sleep state, and whether the detected failure requires that the image forming apparatus shift to the standby state after being restarted;

changing, in a case where it is determined that the transition information indicates that the image forming apparatus is started by shifting the power-off state to the sleep state, and that the detected failure requires that the image forming apparatus shift to the sleep state after being restarted, the transition information so that the transition information indicates that the image forming apparatus is started by shifting the power-off state to the standby state;

detecting an instruction to supply power in the power-off state of the image forming apparatus; and performing control such that the image forming apparatus is started by shifting from the power-off state to the standby state or is started by shifting from the power-off state to the sleep state based on the retained transition information when the instruction to supply power to the image forming apparatus is detected.

6. A system comprising:

an image forming apparatus; and a management apparatus, wherein the management apparatus includes:

a management apparatus processor, a reception unit configured to receive, from the image forming apparatus, a failure occurrence event of the image forming apparatus, and transition information indicating that the image forming apparatus is started by shifting from a power-off state to a standby state or that the image forming apparatus is started by shifting from the power-off state to a sleep state, a determination unit configured to determine whether the transition information indicates that the image forming apparatus is started by shifting the power-off state to the sleep state, and whether the received failure occurrence event requires that the image forming apparatus shift to the standby state after being restarted, a changing unit configured to change, in a case where the determination unit determines that the transition information indicates that the image forming apparatus is started by shifting the power-off state to the sleep state, and that the received failure occurrence event requires that the image forming apparatus shift to the standby state after being restarted, the transition information so that the transition information indicates that the image forming apparatus is started by shifting the power-off state to the standby state, and a transmitting unit configured to transmit the changed transition information to the image forming apparatus, wherein the management apparatus processor implements the reception unit, the determination unit, the changing unit, and the transmitting unit, and wherein the image forming apparatus includes:

a detection unit implemented by an apparatus processor configured to detect an instruction to supply power in the power-off state of the image forming apparatus, and a control unit, implemented by an apparatus processor and configured to perform control such that the image forming apparatus is started by shifting from the power-off state to the standby state or is started by shifting from the power-off state to the sleep state based on the transition information received from the management apparatus when the detection unit detects the instruction to supply power to the image forming apparatus.

7. The image forming apparatus according to claim 6, wherein the management apparatus further includes a failure detection unit configured to detect occurrence or resolution of a failure in the image forming apparatus, and wherein the setting unit sets the transition setting information of the power supply state based on the occurrence or the resolution of the failure detected by the failure detection unit.

8. The system according to claim 6, wherein the management apparatus further includes a job management unit configured to manage a number of job logs, and wherein the setting unit sets the transition setting information of the power supply state based on the number of job logs managed by the job management unit.

9. The system according to claim 6, wherein the management apparatus further includes a retaining unit configured to retain, if the changing unit has changed the transition information so that the transition information indicates that the image forming apparatus is started by shifting the power-off state to the standby state, information indicating that the changing unit has changed the transition information.

10. The system according to claim 9, wherein the reception unit further receives, from the image forming apparatus, a failure resolution event of the image forming apparatus, wherein, in a case where the reception unit receives the failure resolution event of the image forming apparatus, and where the retaining unit retains the information indicating that the changing unit has changed the transition information, the changing unit changes the transition information so that the transition information indicates that the image forming apparatus is started by shifting the power-off state to the sleep state, and wherein the transmitting unit transmits the changed transition information to the image forming apparatus.

11. The system according to claim 10, wherein, in case where the changing unit has changed the transition information so that the transition information indicates that the image formatting apparatus is started by shifting the power-off state to the sleep state, the changing unit deletes the information indicating that the changing unit has changed the transition information, which is retained in the retaining unit.

12. A non-transitory computer readable storage medium storing computer executable instructions for causing a computer to execute a method for controlling an image forming apparatus, the method comprising:

retaining transition information indicating that the image forming apparatus is started by shifting from a power-off state to a standby state or that the image forming apparatus is started by shifting from the power-off state to a sleep state;

detecting that a failure has occurred in the image forming apparatus;

determining whether the transition information indicates that the image forming apparatus is started by shifting the power-off state to the sleep state, and whether the detected failure requires that the image forming apparatus shift to the standby state after being restarted;

changing, in a case where it is determined that the transition information indicates that the image forming apparatus is started by shifting the power-off state to the sleep state, and that the detected failure requires that the image forming apparatus shift to the sleep state after being restarted, the transition information so that the transition information indicates that the image forming apparatus is started by shifting the power-off state to the standby state;

detecting an instruction to supply power in the power-off state of the image forming apparatus; and performing control such that the image forming apparatus is started by shifting from the power-off state to the standby state or is started by shifting from the power-off state to the sleep state based on the retained transition information when the instruction to supply power to the image forming apparatus is detected.

* * * * *